United States Patent [19]

Woolley et al.

[11] 4,167,919

[45] Sep. 18, 1979

[54] METHOD AND APPARATUS FOR HYDROGEN FUELED INTERNAL COMBUSTION ENGINES

[75] Inventors: Ronald L. Woolley; Vaughn R. Anderson, both of Orem, Utah

[73] Assignee: Billings Energy Corporation

[21] Appl. No.: 855,302

[22] Filed: Nov. 28, 1977

[51] Int. Cl.$^2$ .................. F02D 19/00; F02D 47/00
[52] U.S. Cl. .................. 123/1 A; 123/25 R; 123/25 E; 123/DIG. 12
[58] Field of Search .......... 123/1 A, DIG. 12, 25 R, 123/25 E, 3

[56] References Cited

U.S. PATENT DOCUMENTS

| | | | |
|---|---|---|---|
| 2,671,311 | 3/1954 | Rohrbach | 123/25 R |
| 3,362,883 | 1/1968 | Wright | 123/DIG. 12 |
| 3,696,795 | 10/1972 | Smith et al. | 123/DIG. 12 |
| 3,817,221 | 6/1974 | Nohira et al. | 123/25 R |
| 3,818,875 | 6/1974 | Phillips et al. | 123/1 A |
| 3,842,808 | 10/1974 | Cataldo | 123/25 R |
| 3,983,882 | 10/1976 | Billings | 123/DIG. 12 |
| 4,003,343 | 1/1977 | Lee | 123/DIG. 12 |

Primary Examiner—Ira S. Lazarus
Attorney, Agent, or Firm—Criddle, Thorpe & Western

[57] ABSTRACT

An internal combustion engine designed to operate with hydrogen fuel, comprises means for mixing water in the form of droplets, spray, or mist with gaseous hydrogen. The water-containing hydrogen gas is then introduced along with air in proportion for practical internal combustion and efficient power output to the cylinders or combustion chambers of the engine for combustion. In one embodiment of the invention, water vapor is condensed from the exhaust gases from the engine, and the condensed water is used as the source of water to be mixed with hydrogen fuel so as to provide a continuing, self-supporting system. The resulting exhaust emissions from the engine are very low in oxides of nitrogen, and, in addition, engine backfiring is eliminated while the efficiency and power output of the engine is improved.

16 Claims, 4 Drawing Figures

1

METHOD AND APPARATUS FOR HYDROGEN FUELED INTERNAL COMBUSTION ENGINES

BACKGROUND OF THE INVENTION

Field: This invention relates to internal combustion engines which are designed to operate on gaseous hydrogen fuel. In particular, the invention relates to methods of inhibiting backfiring and reducing the generation of oxides of nitrogen during the operation of such engines.

State of the Art: Internal combustion engines utilizing hydrogen fuel may be operated at low power outputs without difficulty provided the timing is properly set for the gaseous hydrogen mixture used as the fuel. At higher power outputs, an intermittent problem of ignition in the intake manifold (backfiring) is encountered. Without some means of suppression of backfiring, the engine cannot be made to run continuously at the higher power outputs required in conventional automobiles. In addition, the formation of oxides of nitrogen ($NO_x$) increases as the power output of an internal combustion engine operating on hydrogen fuel is increased.

In U.S. Pat. No. 3,983,882, issued to Roger E. Billings on Oct. 5, 1976, it is reported that the addition of water to the hydrogen-air mixture in the intake manifold of an internal combustion engine is an effective means of suppressing the tendency of the engine to backfire and of reducing the production of oxides of nitrogen during the combustion. In accordance with the teachings of that patent, gaseous hydrogen fuel is mixed with a predetermined amount of air, and water is added to the mixture of hydrogen and air at the intake manifold of the engine.

SUMMARY OF THE INVENTION

In accordance with the present invention, water is inducted into the hydrogen fuel stream, and the water-laden hydrogen is mixed with air and delivered to the engine intake for sequential combustion in the cylinders of the engine. Conventional internal combustion engine structures and tooling are used. Although water from any source could be used in accordance with the invention, in a preferred embodiment of the invention, water vapor formed during the combustion of hydrogen is condensed and used as the source of water inducted into the hydrogen fuel stream. A reservoir maintains a water level ample for the induction operation. Sufficient water is produced to maintain predetermined water input. The formation of oxides of nitrogen in the combustion process of the hydrogen fuel is reduced by a factor of between 3 and 20 in comparison with the hydrogen internal combustion engine systems of U.S. Pat. No. 3,983,882, by introducing the water directly to the hydrogen fuel stream prior to admixing the hydrogen fuel with air. Backfiring to the intake manifold of the engine is eliminated as a problem in the hydrogen fueled engine of this invention. The input water quenches the hydrogen combustion process, thereby slowing down the hydrogen combustion rate, and thus substantially eliminating the backfiring problem.

Water is introduced into the hydrogen fuel stream by an injector nozzle or carburetor. The water-laden hydrogen is then mixed with air in a conventional gas metering device. The hydrogen-air mixture is then fed to the intake of the internal combustion engine.

A static water storage tank is not needed but could be employed if desired. Thermostatically controlled drains automatically empty water-using components to prevent their freezing-up when the engine is out of use during freezing conditions. Anti-freeze is not required. Sufficient water becomes available promptly upon start-up of the engine, and thus replenishment or storage is unnecessary.

THE DRAWINGS

DESCRIPTION OF THE INVENTION

Figure 1:
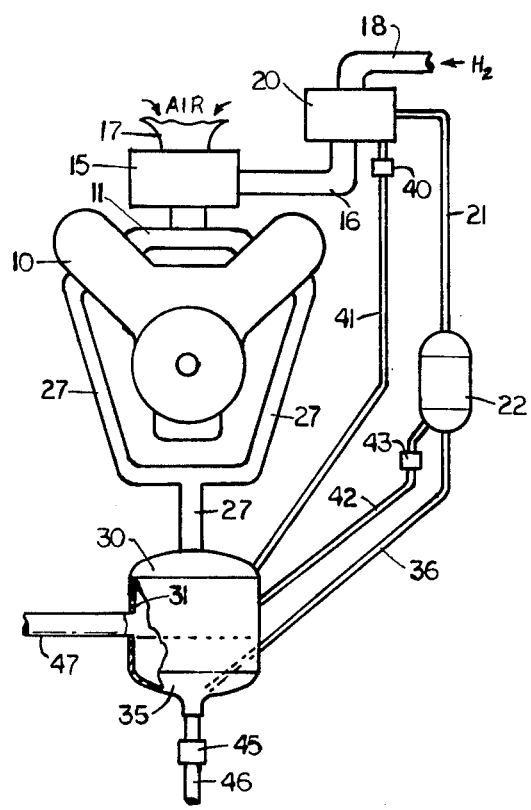
FIG. 1 is a diagrammatic representation of an exemplary form of the hydrogen fueled engine system in accordance with the present invention.

The engine 10 of FIG. 1 utilizes two carburetors 15 and 20 in series flow relation. Carburetor 15 is designed to mix hydrogen gas and air, and feed the gas mixture to the intake manifold 11 of the engine 10. Gaseous hydrogen ($H_2$) is fed to carburetor 15 via supply line 16. Line 16 is supplied with gaseous $H_2$ at relatively low pressure. Air input duct 17 leads into the carburetor 15, and air is mixed in preset proportion with the gaseous hydrogen being introduced through line 16. A commercially available carburetor for unit 15 is an air-gas valve diaphram-operated type, as made by IMPCO.

The gaseous hydrogen fed to carburetor 15 contains water in the form of vapor, droplets, mist, spray, or combination thereof. Water is introduced into the hydrogen stream in supply line 16 by carburetor 20 which is located upstream of line 16 from carburetor 15. Carburetor 20 may be the usual liquid-gas type, and serves as the water metering device. Gaseous hydrogen at relatively low pressure is introduced into carburetor 20 through duct 18, and water is introduced into carburetor 20 by supply line 21. The carburetor 20 is readily adapted for the hydrogen and water flow respectively, by making its jet nozzles of suitable size, or by adjusting its metering capability of hydrogen and water, respectively.

Condensed water is directed in the carburetor 20 through supply line 21 by pump 22. The predetermined mass ratio of water to hydrogen in the gas mixture from carburetor 20 is substantially maintained by the settings in that carburetor. The overall air proportion with respect to both hydrogen and water is maintained by the settings in carburetor 15, as will be understood by those skilled in the art.

The mixture of air, hydrogen, and water is conducted, in a quantity or volume as determined by the throttle setting of carburetor 15, into the intake manifold 11 of engine 10 for sequential combustion in the cylinders thereof. The exhaust from engine 10 is introduced directly to condenser 30 by exhaust manifold 27. The condenser 30 serves as a precooler, and acts to muffle sounds from the engine 10. The interior surface of the walls 31 of condenser 30 are proportioned to condense out and convert contained water vapor into sufficient water for the peak demands of the engine 10. The water enters a small reservoir section 35 of condenser 30, wherein it is retained for future induction to carburetor 20. A feed line 36 extends from an opening in the lower region of the reservoir 35 to the input of water pump 22. Water pump 22 then forwards the water through supply line 21 to carburetor 20. Pump 22 may be electrically driven or mechanically driven from the engine.

The condenser 30 is designed to condense out water at a sufficient rate to serve under all steady-state driving conditions. A small reservoir section 35 is included in condenser 30 to store enough water to handle at least the rapid transient drive demand, such as the passing of another car at high speed. A storage of from about ½ to about 2 or 3 liters of water is sufficient for such spurts, depending on the power output of the engine. Residual gases and water vapor from the exhaust within condenser 30, together with excess condensed water or overflow from reservoir 35 exit through the exhaust pipe 47.

An important feature in the present invention, is a system to automatically prevent water freeze-up in the components of the water induction sub-system during freezing conditions when the engine is not in use. Towards this end, a thermostatically controlled valve is placed at the drain port of water carburetor 20, at the chamber drain of pump 22, and at the base of the reservoir 35. Thermal valve 40 at the base of carburetor 20 communicates to condenser 30 via tubing 41. Thermal valve 43 at pump 22 also is drained into condenser 30 by tubing 42. Thermostatically controlled valve 45 drains the reservoir 35 through exit piping 46. The thermostatic controls 40, 43, and 45 are preset to acuate their respective valves to "open" to effect their drain function at and below a predetermined temperature period. The preset temperature depends upon respective location in the engine compartment, and a somewhat empirical determination of what ambient temperature would result in freezing of the water within the engine compartment. Settings in the range of 32° F. to even 40° F. are in order with a "safe" setting being about 35° F.

In any event, when the engine is in operation, the engine compartment temperature is much above the preset temperature, and the valves remain "closed" even during sub-freezing winter weather, so that the water condensation and induction process can proceed. During engine start-up with the water drained, the engine warms up rapidly and triggers the temperature set valves to "closed". Further, condensation of sufficient water from the engine exhaust for induction to the engine with the hydrogen fuel is rapid. In fact the reservoir 35 fills with water quickly after start-up of the engine.

Figure 2:
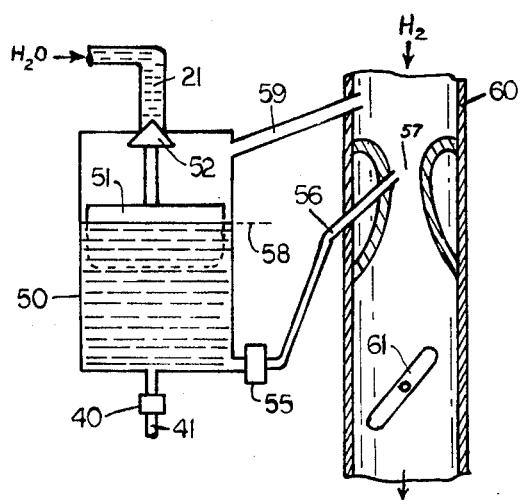
FIG. 2 is a schematic cross-sectional view of a carburetor used in introducing water in predetermined mass ratio with the hydrogen fuel stream.

An exemplary water carburetor 20 is illustrated in FIG. 2. It is basically like a conventional gasoline carburetor. The water supply line 21 ends at a needle valve in the upper part of receiving chamber 50. When sufficient water is in chamber 50 the float 51 closes needle valve 52. A metering orifice or jet 55 is at the base of chamber 50. It proportions the flow of water into tube 56 that extends to the throat of venturi 57. The end of the tube 56 is above the water level 58. A vent line 59 extends from chamber 50 into mixing chamber 60. Throttle valve 61 is positioned in the exit region of chamber 60.

Figure 3:
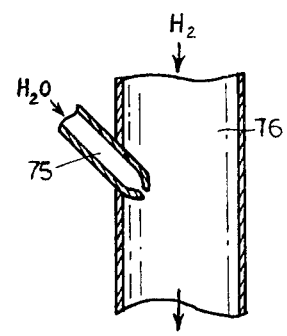
FIG. 3 is a schematic cross-sectional of an injector nozzle used to introduce water into the hydrogen gas stream.

FIG. 3 shows another version of apparatus applicable for mixing water with the hydrogen gas stream. In this version jet nozzle 75 is used to inject water into the hydrogen stream in place of the carburetor described hereinbefore. The gaseous hydrogen is fed directly to the supply line 16 of carburetor 15, through the injector nozzle 75. Water is injected into line 16 in measured amount through nozzle 75 in known manner. The resultant water spray mixes with the hydrogen gas stream, and the gas mixture is passed to the intake manifold 11 of the internal combustion engine 10. The mass ratio of the water to hydrogen in the combined mixture (with air) is predetermined as set forth hereinafter for optimum results. The injector nozzle may be mechanical devices known in the art, as well as electronic injectors, such as manufactured by the Robert Bosch Company of Stuttgart, Germany.

The term "induction" is used to mean that mixing is accomplished by the fluid dynamics of the intake system, as by vacuum, venturi, orifices, and the like. The term "injection" is used to mean that the input is forced directly through an injector nozzle, as by a pump. "Introduction" is used herein as a generic term with respect to "induction" and "injection", or other manner of mixing water with gaseous hydrogen and presenting the hydrogen mixture to the intake of the engine.

The condenser 30 as shown in FIG. 1, may be an "open box" having its internal walls 31 serving as the condensing structure. Walls 31 are exposed internally to the hot vapor-laden exhaust. The exterior of the walls are exposed to the ambient temperature in the engine compartment region. For a small (50 brake horsepower) vehicle, about 2.5 square feet of internal wall 31 surface will continuously condense-out sufficient water for the engine system thereof. The surface required is generally linear with the brake horsepower of the engine. Thus, a 100 brake horsepower car would use about 5 square feet of internal wall surface 31 in condenser 30. A "collection chamber" is preferably included within unit 30, so that water droplets will precipitate from the exhaust stream rather than for the most part be blown out through the tailpipe 47. Condenser 30 configuration and size may be optimized by methods well known in the art, such as by corrugation of the walls, or by interior finned tubing as through which an engine cooling medium passes. A series of tests were performed on a V-8 engine which had been modified to raise the compression ratio from about 8:1 to about 12:1 for operation using gaseous hydrogen as the fuel. The modification was accomplished by replacing the pistons in the engine and shaving the heads slightly. The engine was mounted on an induction dynamometer manufactured by the General Electric Company. The ignition system of the engine was essentially the same as supplied by the manufacturer thereof.

Oxides of Nitrogen ($NO_x$) were measured with a Thermoelectron, Series 14, Chemiluminescent Analyzer, Model 12A. This analyzer provided interference-free, linear, continuous monitoring of engine exhaust. Equivalence ratio, i.e., the fraction of hydrogen contained in the fuel mixture relative to the chemically correct quantity for a given amount of oxygen in the fuel mixture, was monitored by measuring the amount of oxygen remaining in the exhaust gas with a Beckman oxygen analyzer, Model 715.

In one set of tests, water was inducted into the air-hydrogen mixture in the intake manifold of the engine, in accordance with U.S. Pat. No. 3,983,882. In a second set of comparative tests, water was mixed with the hydrogen stream, and the water-laden hydrogen was then mixed with air, to produce a fuel mixture which was then delivered to the engine intake for sequential combustion in the cylinders of the engine. In both sets of tests, the water flow rate was measured by a Fisher-Porter rotameter, and the hydrogen flow rate was measured with a Schutle and Koerting rotameter, using the calibration curve supplied by the manufacturer.

Figure 4:
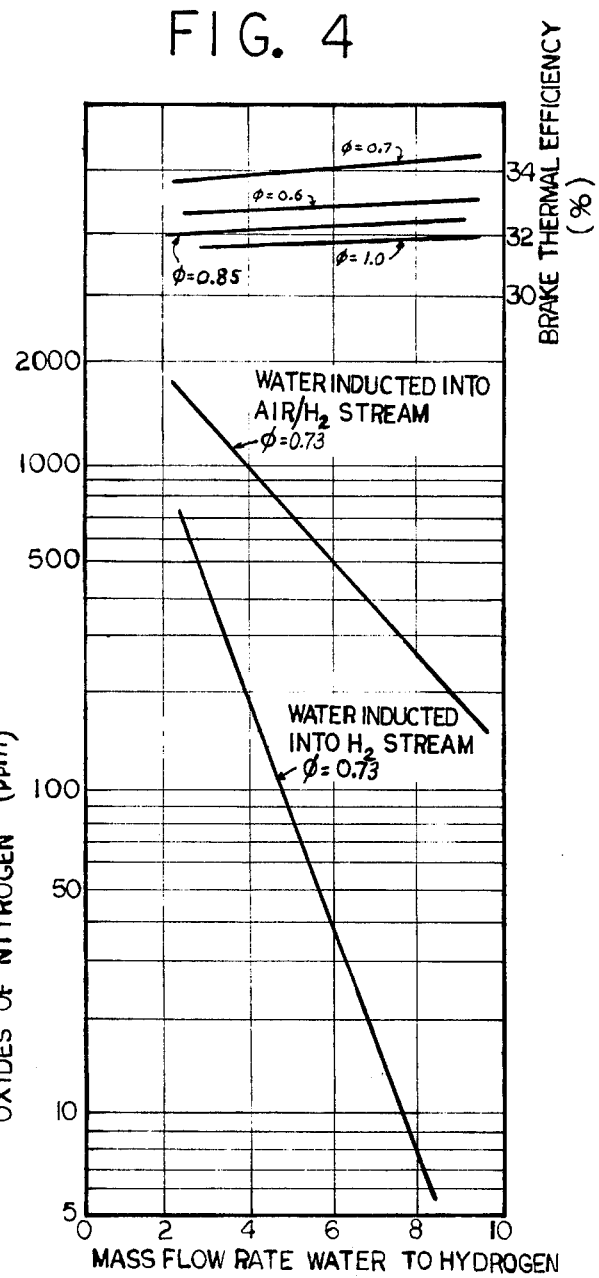
FIG. 4 is a graph showing the reduction of oxides of nitrogen achieved by the present invention and the relationship between engine efficiency and the equivalence ratio of hydrogen to oxygen in the fuel being burned.

The results of these tests, in general, confirmed the teaching of U.S. Pat. No. 3,983,882, in that the induction of water into the fuel, whether mixed with the hydrogen gas prior to or after mixing of the hydrogen gas with air, has positive advantages both on emissions and on performance of the engine. The generation of oxides of nitrogen is greatly reduced, and backfiring of the engine is eliminated when mass ratios of water to hydrogen of above two are used. However, as can be seen from the results shown in FIG. 4, a 3-fold to 20-fold reduction is achieved in the amount of oxides of nitrogen generated by the engine by the process of the present invention in comparison to the process of U.S. Pat. No. 3,983,882. In addition, another significant improvement is obtained by the present invention. As shown in FIG. 4, for any given equivalence ratio the percent oxides of nitrogen generated can be reduced greatly. This allows operation of the engine at its highest possible equivalence ratio, and as shown in the upper portion of FIG. 4, the break thermal efficiency of a hydrogen-fueled, internal combustion engine tends to be a maximum at an equivalence ratio of about 0.7. When the engine upon which the present tests were made was operated using the prior art method of inducting water and at an equivalence ratio of about 0.7, it generated at least 200 parts per million oxides of nitrogen in its exhaust. On the other hand, by inducting the water in accordance with the present invention, the same engine operates at the equivalence ratio of 0.7, with less than about 10 parts per million oxides of nitrogen generated in its exhaust.

Although applicants do not intend to be limited by any theory of operation of the invention, it is believed that by inducting the water into the hydrogen stream ahead of the air mixer, the water follows the hydrogen so that greater water concentrations are obtained where there is a greater fuel concentration. From studies of the exhaust from the individual cylinders of the engine, it has been shown that the distribution of hydrogen to the cylinders of the engine is slightly non-uniform, with about 10 percent variation occuring in the equivalence ratio between cylinders. The variance in equivalence ratio does not effect the overall performance of the engine; however, the production of oxides of nitrogen is an exponential function of equivalence ratio, and the slight nonuniformity can result in an order of magnitude difference in the production of oxides of nitrogen from cylinder to cylinder. By having greater concentration of water where there is a greater fuel concentration, the suppression of the formation of oxides of nitrogen is optimized.

We claim:

1. An internal combustion engine comprising one or more combustion chambers; an engine fuel intake for delivering a fuel mixture of gaseous hydrogen and air to said chambers for sequential combustion therein; fuel feed means for providing a gaseous fuel mixture of hydrogen and air in metered relation to the engine fuel intake; a hydrogen supply line for introducing gaseous hydrogen to said fuel feed means; water distributing means for producing water droplets, spray, or mist from supplied liquid water and for introducing said water droplets, spray, or mist to said hydrogen supply line to mix with the gaseous hydrogen therein prior to the introduction of said gaseous hydrogen to said fuel feed means; condensor means for condensing water vapor from the combustion gases resulting from the combustion of hydrogen in said chambers; and means for supplying the condensed water to said water distributing means in such proportion to provide sufficient water in the fuel mixture to inhibit backfiring during operation of the engine as well as to reduce the oxides of nitrogen in the exhaust gases from the engine.

2. An internal combustion engine in accordance with claim 1, wherein said fuel feed means is a carburetor that is adapted to mix the gaseous hydrogen and water mixture supplied thereto with intake air.

3. An internal combustion engine in accordance with claim 2, wherein said water distributing means is a second carburetor positioned in series flow ahead of the other carburetor, said second carburetor being adjustable to supply the intake water droplets, spray, or mist in a predetermined mass ratio proportioned to the intake hydrogen generally over the engine operating range.

4. An internal combustion engine in accordance with claim 3, wherein said second carburetor includes a metering device that in general maintains that mass ratio of the water to hydrogen in the gas being introduced to said first carburetor at a predetermined level.

5. An internal combustion engine in accordance with claim 4, wherein said metering device maintains that mass ratio of water to hydrogen in the order of 2:1 or greater.

6. An internal combustion engine in accordance with claim 3, wherein said first and second carburetor means are adjusted to maintain the mass ratio of the water to hydrogen supplied to the engine intake in the order of 2:1 or greater.

7. An internal combustion engine in accordance with claim 2, wherein said water distributing means is a device for injecting water droplets, spray, or mist to said hydrogen supplied line.

8. An internal combustion engine in accordance with claim 7, wherein said water distributing means injects water to said hydrogen supply line at a rate to maintain the mass ratio of water to hydrogen in the gas introduced to said fuel feed means in the order of 2:1 or greater.

9. In an internal combustion engine having an engine fuel intake, one or more chambers in which fuel combustion occurs, fuel feed means for introducing gaseous hydrogen and air in metered relation to the engine fuel intake for combustion in the chambers, and a hydrogen supply line for providing the fuel feed means with gaseous hydrogen, the improvement comprising: water induction means for producing finely divided water including droplets, spray, or mist from input water and for introducing the finely divided water into the hydrogen gas supply line; a reservoir for holding water; and means for conveying water from said reservoir to said water induction means, said water being added to the hydrogen in said hydrogen gas supply lines in such proportion as to inhibit backfiring and generation of nitrogen oxides when the hydrogen gas is subsequently combusted in said chambers.

10. An internal combustion engine in accordance with claim 9, wherein said water induction means comprises a carburetor which is adapted to mix finely divided water from input water with the hydrogen gas in said hydrogen supply line.

11. An internal combustion engine as in claim 10 wherein said carburetor is adapted to maintain the mass ratio of the water to hydrogen in the order of 2:1 or greater.

12. An internal combustion engine in accordance with claim 9, wherein said water induction means comprises a device for injecting finely divided water into the hydrogen supply line.

13. An internal combustion engine in accordance with claim 12, wherein said device is adapted to maintain the mass ratio of the water to hydrogen in the order of 2:1 or greater.

14. A method of inhibiting backfiring and generation of oxides of nitrogen in a hydrogen-fueled internal combustion engine comprising: (a) storing water; (b) producing liquid water droplets, spray, or mist from the stored water; (c) mixing the droplets, spray, or mist with gaseous hydrogen; and (d) introducing air and the gaseous mixture of hydrogen and water droplets, spray, or mist in metering relation to the engine intake for combustion in the cylinders, wherein the water droplets, spray, or mist is admixed with the hydrogen in a predetermined mass ratio sufficient to inhibit backfiring and the generation of oxides of nitrogen during the operation of said engine.

15. A method in accordance with claim 14 wherein step (a) comprises: (f) condensing water vapor contained in the exhaust from the hydrogen combustion process, and (g) depositing the condensed water in a storage reservoir.

16. A method in accordance with claim 14 wherein water is admixed with hydrogen in a mass ratio of water to hydrogen in the order of 2:1 or greater.

* * * * *